United States Patent
Hicok

(10) Patent No.: US 11,955,787 B2
(45) Date of Patent: Apr. 9, 2024

(54) ELECTRICAL PANEL COVER FASTENING SYSTEM

(71) Applicant: Michael W. Hicok, Olney, MD (US)

(72) Inventor: Michael W. Hicok, Olney, MD (US)

( * ) Notice: Subject to any disclaimer, the term of this patent is extended or adjusted under 35 U.S.C. 154(b) by 441 days.

(21) Appl. No.: 17/313,075

(22) Filed: May 6, 2021

(65) Prior Publication Data
US 2021/0351577 A1 Nov. 11, 2021

Related U.S. Application Data

(60) Provisional application No. 63/020,828, filed on May 6, 2020.

(51) Int. Cl.
*H02G 3/14* (2006.01)

(52) U.S. Cl.
CPC ..................................... *H02G 3/14* (2013.01)

(58) Field of Classification Search
CPC .............. E05B 17/0025; E05B 65/006; E05B 65/0064; E05B 65/0089; E05B 65/02; E05B 65/5246; E05B 65/5253; E05C 3/00; E05C 3/004; E05C 3/02; E05C 3/04; E05C 3/041; E05C 3/042; E05C 3/046; E05C 3/10; E05C 19/007; H02G 3/14; Y10T 292/1039; Y10T 292/1041; Y10T 292/108; Y10T 292/1083; Y10T 292/1084; Y10T 292/1085; Y10T 292/1092; Y10T 292/1095; Y10T 292/20; Y10T 292/202; Y10T 292/225; Y10T 292/1077; Y10S 292/11; H02B 1/44; H02B 1/46; A47B 47/00; A47B 2096/207
USPC .............. 312/265.5, 265.6; 248/231.31, 906; 292/240, 241, 197, 212, 251, DIG. 11; 220/324
See application file for complete search history.

(56) References Cited

U.S. PATENT DOCUMENTS

| | | | |
|---|---|---|---|
| 797,768 A * | 8/1905 | Fisher | |
| 978,585 A * | 12/1910 | Huber | |
| 1,357,864 A * | 11/1920 | Harrington | E05B 65/0057 27/DIG. 1 |
| 1,785,709 A | 12/1930 | Campau | |
| 1,804,877 A | 5/1931 | Johnson et al. | |
| 1,876,115 A * | 9/1932 | Way | E05C 5/04 49/276 |
| 1,998,116 A | 4/1935 | Bone | |
| 2,300,525 A | 11/1942 | Rosenberger | |
| 2,950,141 A * | 8/1960 | Koff | F16B 13/0808 292/256.73 |

(Continued)

*Primary Examiner* — Janet M Wilkens
(74) *Attorney, Agent, or Firm* — Jacob M. Ward; Ward Law Office LLC

(57) ABSTRACT

An electrical panel cover fastening system includes a disc and a post. The disc includes an outer surface, a first inner surface, a second inner surface, and a side surface. The outer surface is disposed on a first plane. The first inner surface is disposed on a second plane. The first plane is disposed substantially parallel with the second plane. The second inner surface is disposed on a third plane. The first inner surface is disposed adjacent to the second inner surface. The post includes a first end and a second end. The post is disposed on a first axis. The first end of the post is coupled to the first inner surface of the disc. Where the post is rotated, the disc is thereby also rotated about the first axis.

16 Claims, 9 Drawing Sheets

(56) References Cited

U.S. PATENT DOCUMENTS

| | | | | |
|---|---|---|---|---|
| 3,184,099 A | * | 5/1965 | Gravert | B63B 19/24 |
| | | | | 292/241 |
| 3,339,124 A | | 8/1967 | Jorgensen | |
| 4,131,932 A | | 12/1978 | Brumfield, Jr. et al. | |
| 4,487,330 A | | 12/1984 | Grover et al. | |
| 4,517,623 A | | 5/1985 | Barner et al. | |
| 4,813,726 A | * | 3/1989 | Ravinet | A47B 95/00 |
| | | | | 292/241 |
| 4,904,110 A | | 2/1990 | Klein | |
| 5,127,500 A | * | 7/1992 | Mitchell | A45C 13/26 |
| | | | | 190/902 |
| 5,336,225 A | | 8/1994 | Zang | |
| 5,465,928 A | * | 11/1995 | Massie | B60R 11/00 |
| | | | | 248/27.1 |
| D371,504 S | * | 7/1996 | Massie | D8/349 |
| 5,688,003 A | * | 11/1997 | Beale | E05C 3/10 |
| | | | | 292/202 |
| 2002/0162289 A1 | * | 11/2002 | Hightower | F16B 5/0635 |
| | | | | 52/764 |
| 2005/0161955 A1 | * | 7/2005 | Hicok | E05B 65/006 |
| | | | | 292/240 |
| 2005/0161956 A1 | * | 7/2005 | Hicok | G06F 13/36 |
| | | | | 292/240 |
| 2011/0303675 A1 | * | 12/2011 | Foster | E05C 3/042 |
| | | | | 292/197 |
| 2016/0333609 A1 | * | 11/2016 | VanDeMark | E05B 65/006 |

\* cited by examiner

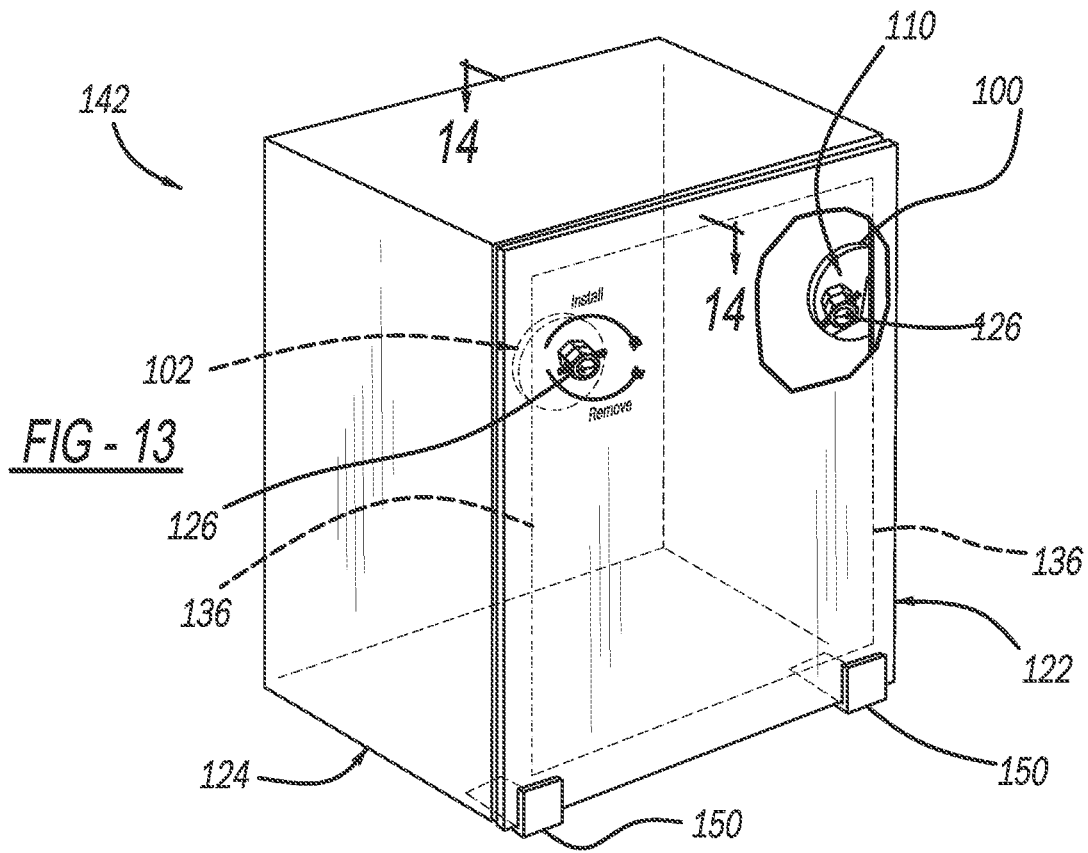
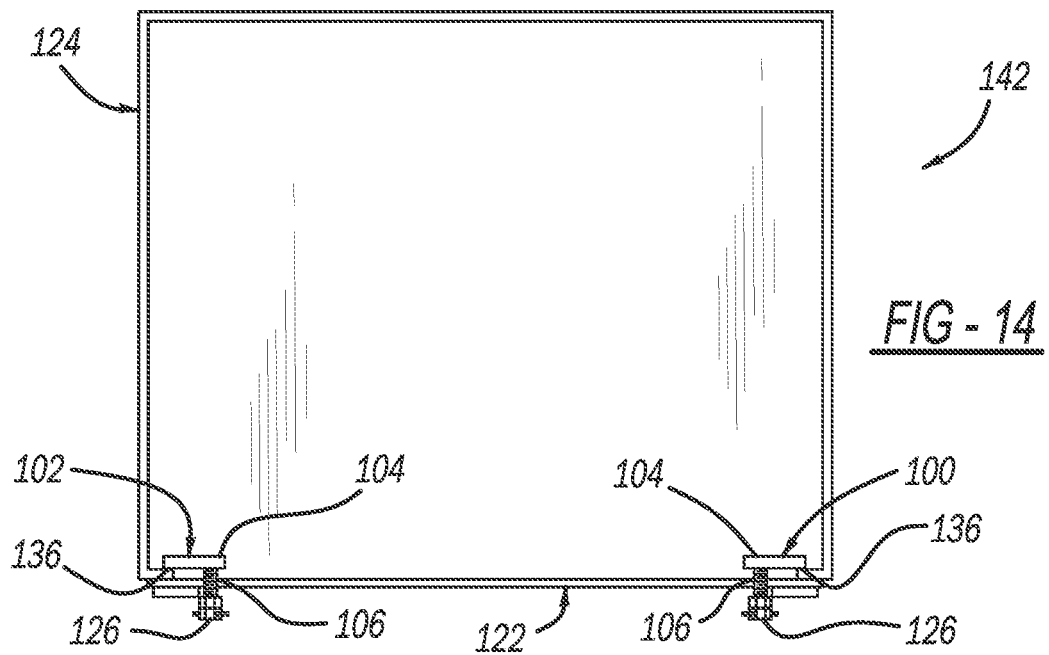

ELECTRICAL PANEL COVER FASTENING SYSTEM

CROSS-REFERENCE TO RELATED APPLICATIONS

This application claims the benefit of U.S. Provisional Application. No. 63/020,828 filed on May 6, 2020. The entire disclosure of the above application is incorporated herein by reference.

FIELD

The present disclosure relates to electrical panels, and more particularly, a fastening system for covers of electrical equipment panels.

INTRODUCTION

This section provides background information related to the present disclosure which is not necessarily prior art.

In many processes involving electrical panels, it is often necessary to secure a cover over the components of the equipment panel. The National Electrical Manufacturers Association (NEMA) typically mandates the construction of panel boxes. All electrical system panel boxes, with the exception of those with hinged covers, have a flanged lip or edge surrounding the box enclosure. The flanged lip or edge in conjunction with the panel cover is designed to protect against dust, light, and indirect splashing of any type of liquids and industrial hazards. The enclosure and the cover protect the electrical equipment in the panel box. The enclosure and the cover also protect personnel from arc flash and electrical shock. The panel box and the cover must also shield electrical equipment from electromagnetic and radio frequency interference. All electrical enclosures must be installed in accordance with the National Electrical Code (NEC). Conventional methods of fastening the covers of energized equipment include: U.S. Pat. Nos. 4,131,932; 3,339,124; 4,487,330; 4,517,623; 1,876,115; 1,804,877; 4,904,110; 1,785,709; 1,998,116; 2,300,525; and 5,336,225, as non-limiting examples. In particular, one conventional method of fastening the covers of energized equipment includes the use of screws.

Using screws to fasten panels and covers of energized equipment can be labor intensive and wasteful. There is a waste of time and user stamina to unscrew a plurality of screws. Additionally, screws are often lost or misplaced when disconnected from the panel. Also, using screws to fasten the covers of energized equipment can result in undesired movements. For instance, the heads of standard screws do not provide a large surface area. This lack of ample surface area can make it more difficult to keep a screwdriver tip disposed thereon when it is necessary to apply increased force to remove a tightly connected screw. The tip of the screwdriver may slip from the small surface area of a screwhead and result in an undesired movement. This undesired movement may result in frustration to the user and a loss in productive time.

There is a continuing need for an electrical panel cover fastening system that provides an efficient and ergonomic process for installing and removing panel covers to and from panel back boxes.

SUMMARY

In concordance with the instant disclosure, an electrical panel cover fastening system that enhances the efficiency and the ergonomics of coupling and removing a panel cover to and from a panel back box, has been surprisingly discovered.

The present technology is drawn to an electrical panel cover fastening system that includes a disc and a post. The disc may include an outer surface, a first inner surface, a second inner surface, and a side surface. The outer surface may be disposed on a first plane. The first inner surface may be disposed on a second plane. The first plane may be disposed substantially parallel with the second plane. The second inner surface disposed on a third plane. The first inner surface may be disposed adjacent to the second inner surface. The post may include a first end and a second end. The post may be disposed on a first axis. The first end of the post may be coupled to the first inner surface of the disc.

In certain embodiments, the electrical panel cover fastening system may be provided as a kit for installation of the panel cover on the panel back box. The kit may include an electrical panel cover fastening system which may further include a disc, a post, and a rotational adjustment means. The disc may include an outer surface, a first inner surface, a second inner surface, and a side surface. The outer surface may be disposed on a first plane. The first inner surface may be disposed on a second plane. The first plane may be disposed substantially parallel with the second plane. The second inner surface may be disposed on a third plane. The first inner surface and the second inner surface may be disposed adjacent to one another. The post may include a first end and a second end. The post may be disposed on a first axis. The first end of the post may be configured to be disposed on the first inner surface of the disc. The post may be configured to be disposed through an aperture in the panel cover. The rotational adjustment means may be configured to be disposed on the second end of the post. The rotational adjustment means may also be configured to rotate the post about the first axis and thereby also rotate the disc about the first axis. In certain circumstances, the kit may further include a panel bracket configured to be attached to the electrical panel back box. The panel bracket may also be configured to support the panel cover.

The electrical panel cover fastening system may be used according to various methods. Such methods may include covering the panel back box. A method for covering the panel back box may include a step of providing an electrical cover fastening system. The electrical panel cover fastening system may include a disc and a post. The disc may include an outer surface, a first inner surface, a second inner surface, and a side surface. The outer surface may be disposed on a first plane. The first inner surface may be disposed on a second plane. The first plane may be disposed substantially parallel with the second plane. The second inner surface may be disposed on a third plane. The first inner surface and the second inner surface may be disposed adjacent to one another. The post may include a first end and a second end. The post may be disposed on a first axis. The first end of the post may be disposed on the first inner surface of the disc. The post may be configured to be disposed through an aperture in a panel cover. The method may further include a step of providing the panel cover with the aperture formed therethrough. The panel back box may also be provided in a step. The panel back box may include an opening which may further include an edge. In certain circumstances, the method may include a step of providing a panel bracket configured to be attached to the electrical panel back box for supporting the panel cover. The panel bracket may be attached to a bottom surface of the panel back box in a step. The electrical panel cover fastening system may be disposed through the aperture in the panel cover in another step. Then, the panel cover may be placed on the panel bracket in a step. Next, the panel cover may be disposed against the opening of the panel back box in a further step. Then, in another step, the electrical panel cover fastening system may be rotated to engage the first inner surface and/or the second inner surface against the edge adjacent the opening of the panel back box, thereby securing the panel cover to the panel back box.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

Figure 5:
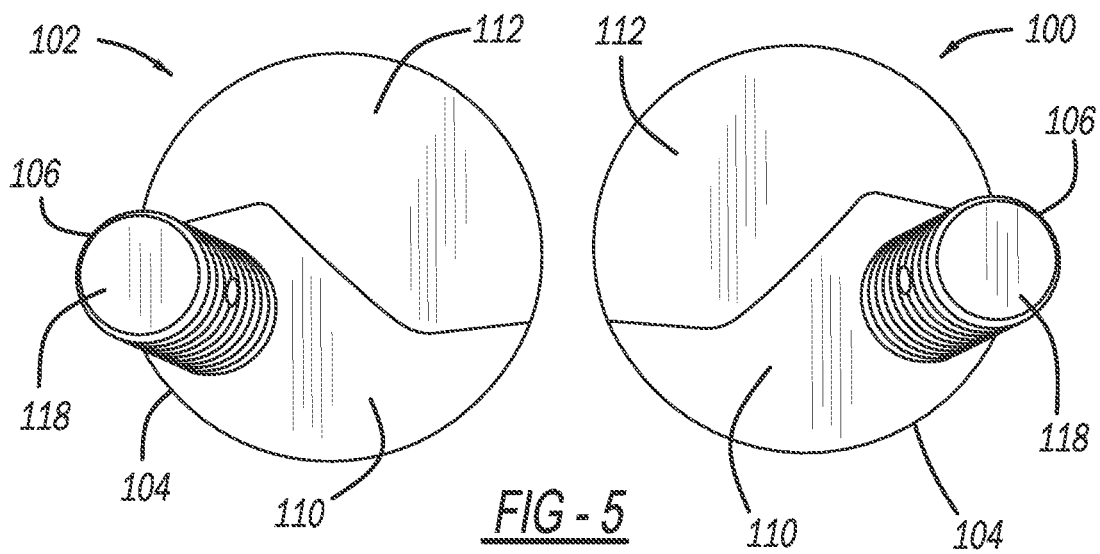
FIG. 5 is a top perspective view of a pair of mirror image electrical panel cover fastening systems, according to another embodiment of the present disclosure.
Figure 6:
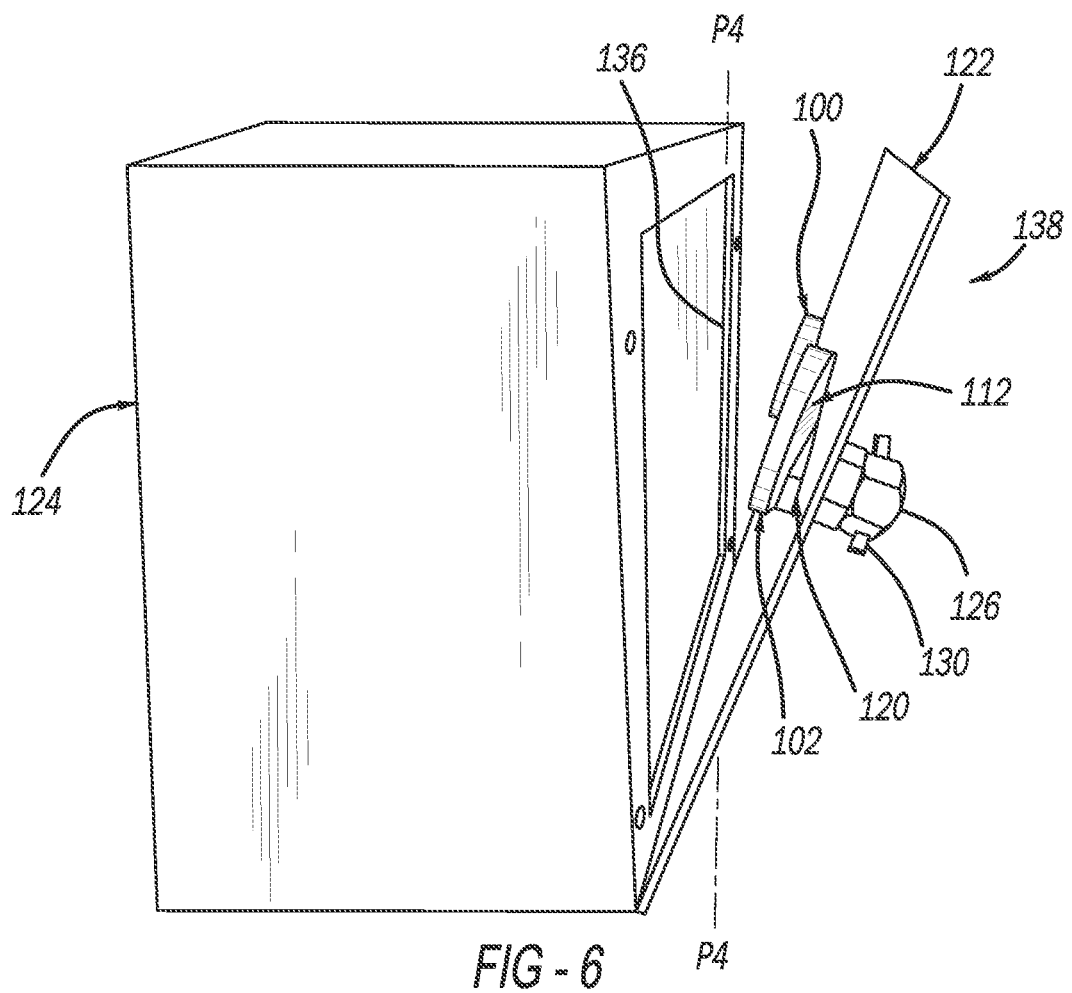
Figure 7:
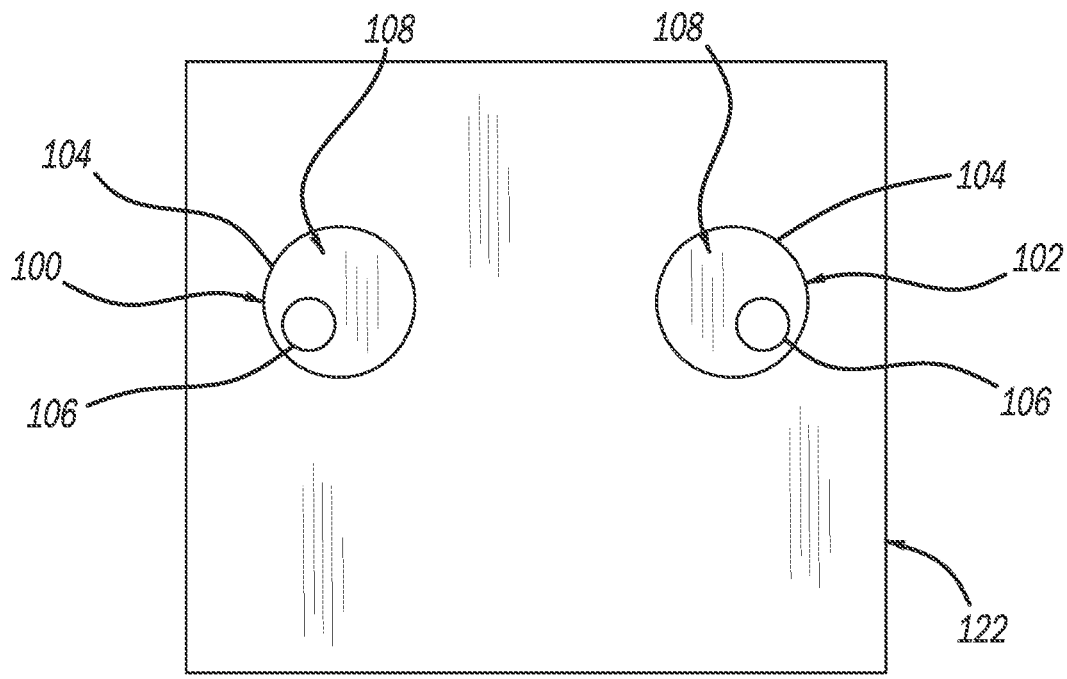
Figure 8:
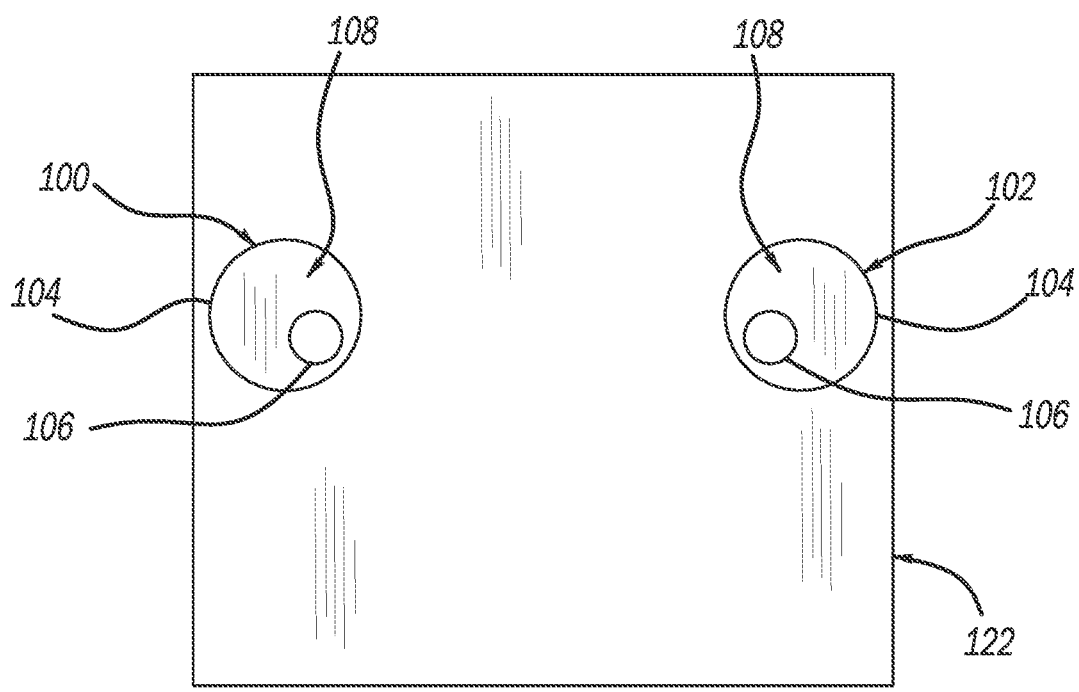
Figure 9:
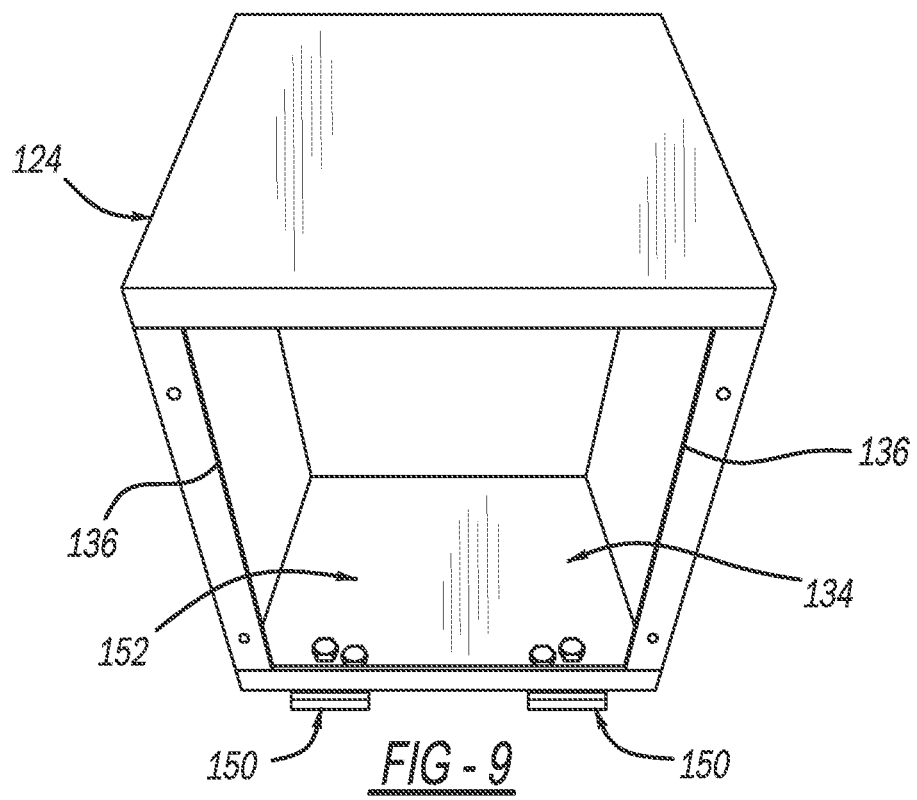
Figure 10:
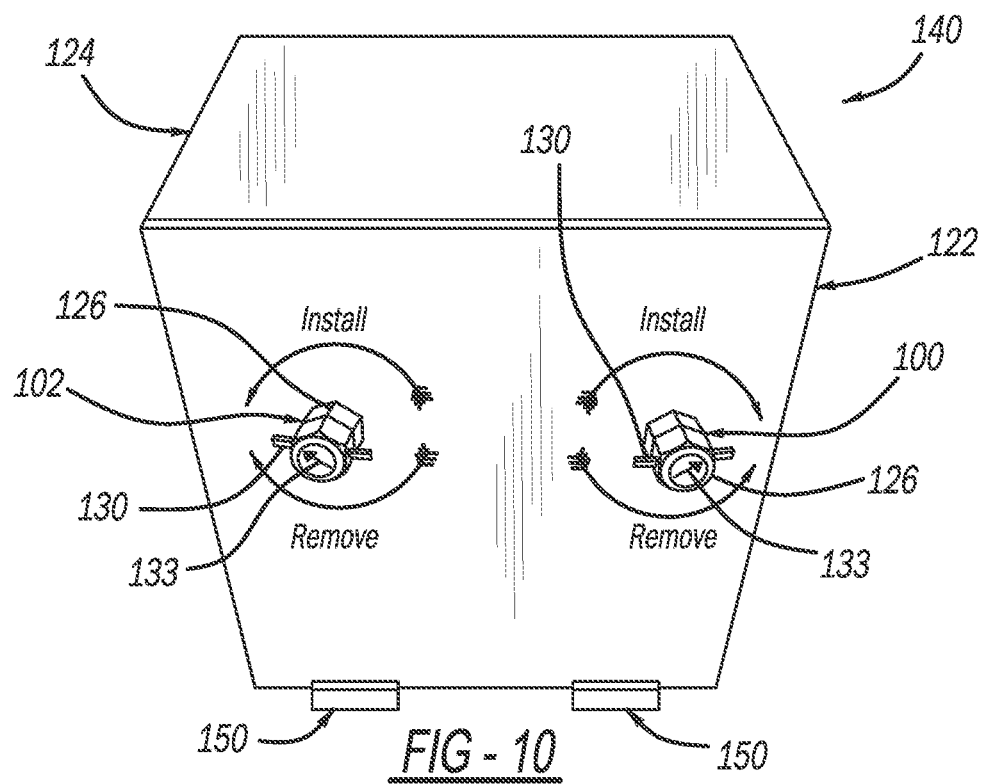
Figure 11:
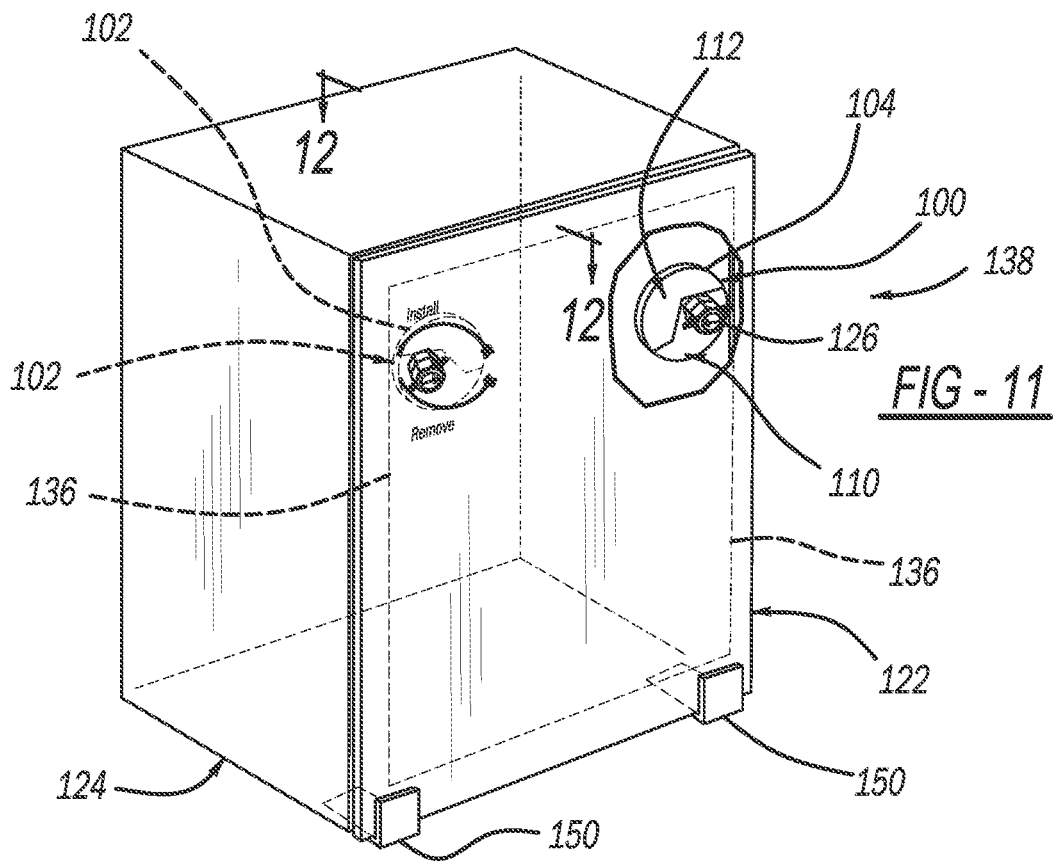
Figure 12:
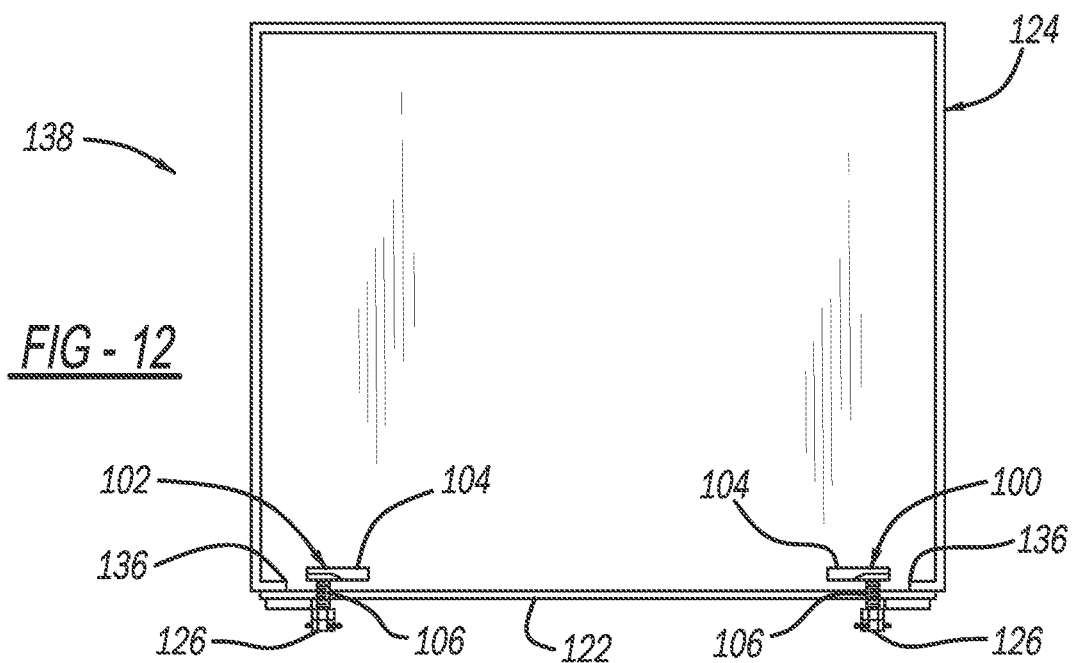
Figure 15:
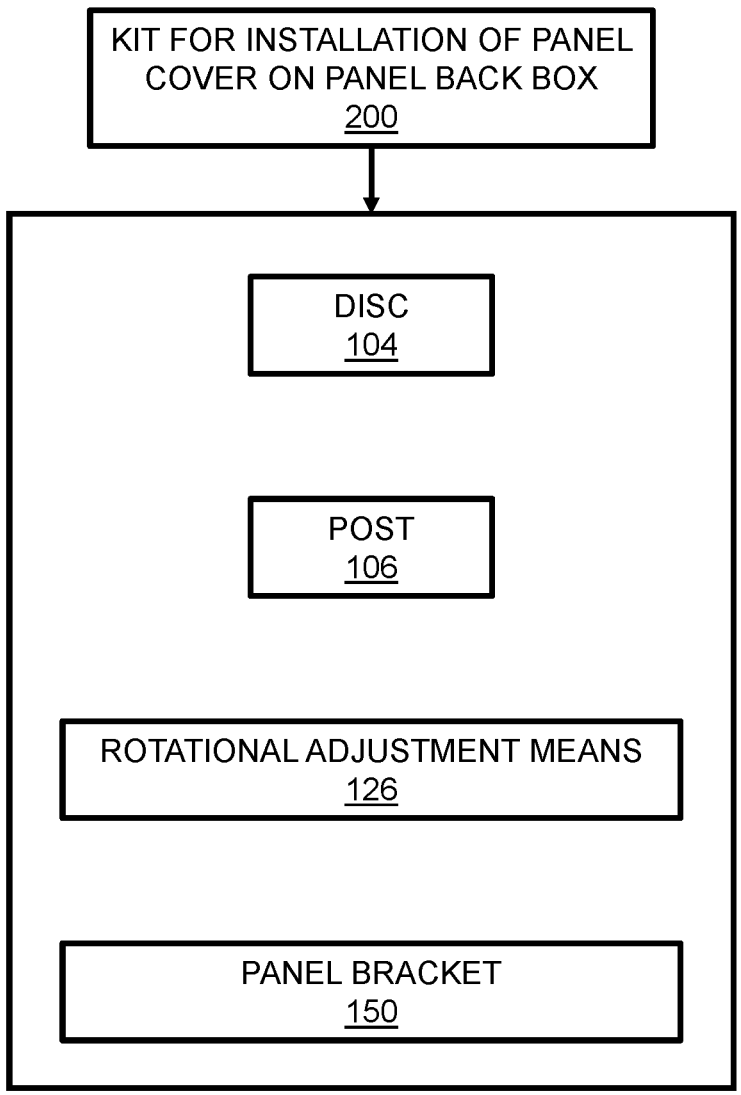
Figure 16:
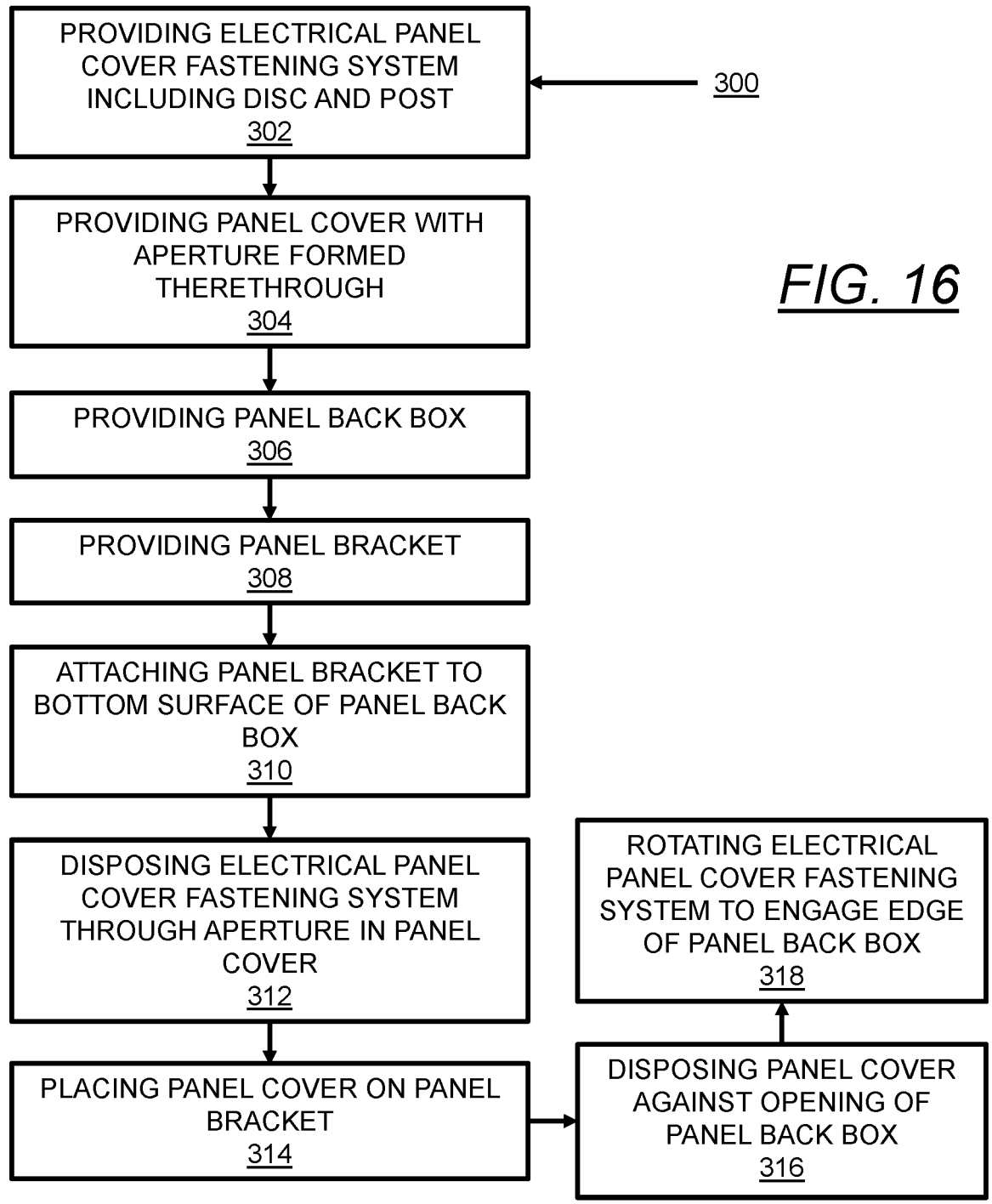

FIG. 6 is a side elevational view of the pair of electrical panel cover fastening systems, as shown in FIG. 5, further depicting the pair of electrical cover fastening systems disposed on a panel cover in an unengaged position, FIG. 7 is a rear elevational view of the pair of mirror image electrical panel cover fastening systems disposed on the panel cover, as shown in FIG. 6, further depicting the mirror image electrical panel cover fastening system disposed in an unengaged position;

FIG. 8 is a rear elevational view of the pair of mirror image electrical panel cover fastening systems disposed on the panel cover, as shown in FIGS. 6-7, further depicting the mirror image electrical panel cover fastening system disposed in a fully engaged position;

FIG. 9 is a front perspective view of the panel back box, further depicting a panel bracket disposed on a bottom surface of the panel back box, according to one embodiment of the present disclosure;

FIG. 10 is a front perspective view of the panel cover coupled to the panel back box, according to one embodiment of the present disclosure;

FIG. 11 is a top perspective view of the panel cover disposed on the panel back box, further depicting the pair of mirror image electrical panel cover fastening systems disposed in an unengaged position, according to one embodiment of the present disclosure;

FIG. 12 is a top plan cross-section view taken at leader line 12-12 in FIG. 11, further depicting the pair of mirror image electrical panel cover fastening systems disposed in an unengaged position, according to one embodiment of the present disclosure;

FIG. 13 is a top perspective view of the panel cover disposed on the panel back box, further depicting the pair of mirror image electrical panel cover fastening systems disposed in a fully engaged position, according to one embodiment of the present disclosure;

FIG. 14 is a top plan cross-section view taken at leader line 14-14 in FIG. 13, further depicting the pair of mirror image electrical panel cover fastening systems disposed in a fully engaged position, according to one embodiment of the present disclosure;

FIG. 15 is a box diagram of a kit for installation of the panel cover on the panel back box, according to one embodiment of the present disclosure; and FIG. 16 is a flowchart of a method for covering the panel back box, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
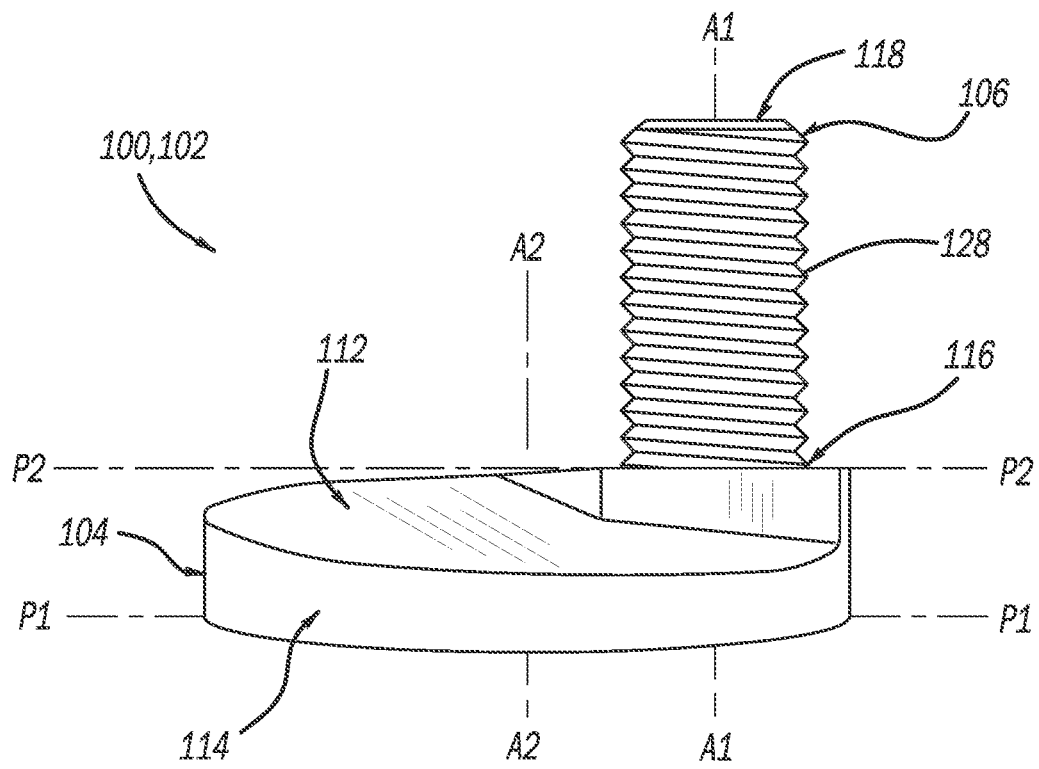
FIG. 3 is a front elevational view of the electrical panel cover fastening system, as shown in FIGS. 1-2.
Figure 4:
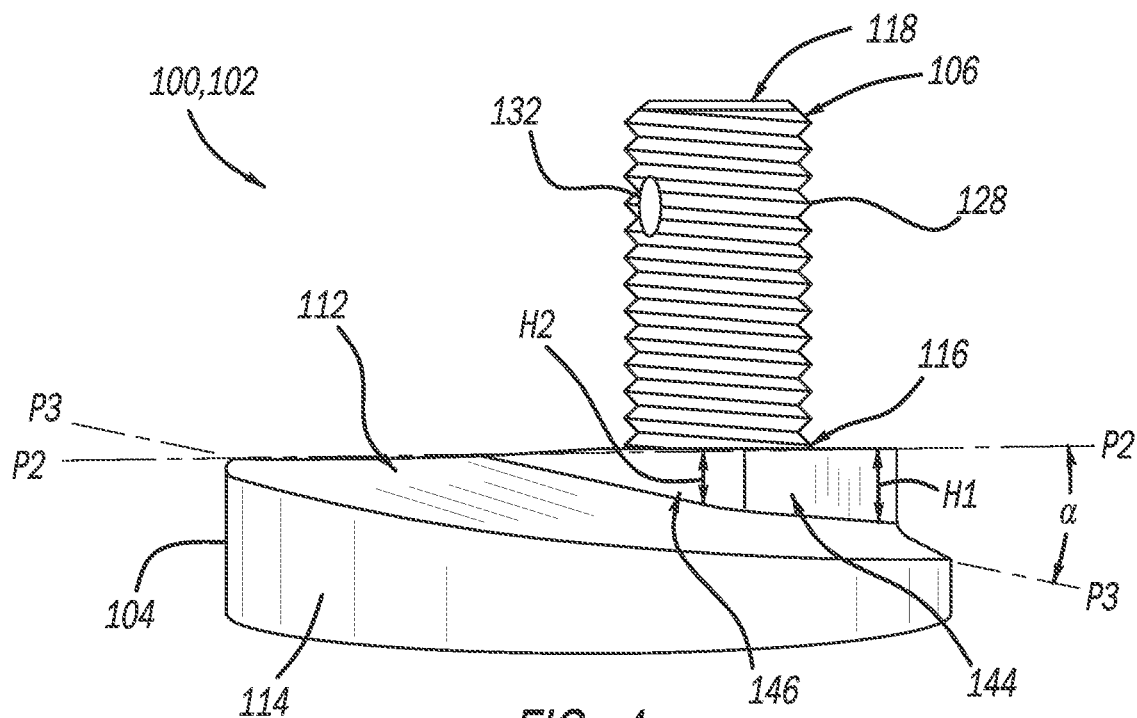
FIG. 4 is a left side elevational view of the electrical panel cover fastening system, as shown in FIGS. 1-3.

The present technology is drawn to an electrical panel cover fastening system 100, 102 that includes a disc 104 and a post 106. As shown in FIGS. 1-8 and 11-14, the disc 104 may include an outer surface 108, a first inner surface 110, a second inner surface 112, and a side surface 114. With particular reference to FIG. 3, the outer surface 108 may be disposed on a first plane P1. The first inner surface 110 may be disposed on a second plane P2. The first plane P1 may be disposed substantially parallel with the second plane P2. As shown in FIG. 4, the second inner surface 112 may be disposed on a third plane P3. The second inner surface 112 may also be described as a sloped or angled surface. It should be understood that second inner surface disposed on the third plane can include a slightly curved surface. The first inner surface 110 may be disposed adjacent to the second inner surface 112. The post 106 may include a first end 116 and a second end 118. With continued reference to FIG. 3, the post 106 may be disposed on a first axis A1. The first end 116 of the post 106 may be coupled to the first inner surface 110 of the disc 104. In a specific example, as shown in FIGS. 7-8, the post 106 may be disposed substantially through the disc 104, and may be bonded to the disc 104. As non-limiting examples, the post 106 may be bonded to the disc 104 through, welding, adhesives, and staking. One skilled in the art may select other suitable methods of coupling the post 106 to the disc 104, within the scope of the present disclosure.

In certain circumstances, as shown in FIG. 6, the post 106 may be configured to be disposed through an aperture 120 in a panel cover 122 for a panel back box 124. The panel cover 122 may be selectively removeable from the panel back box 124. The electrical panel cover fastening system 100, 102 may be configured to selectively retain the panel cover 122 to the panel back box 124.

With reference to FIGS. 6 and 10-14, the electrical panel cover fastening system 100, 102 may also include a rotational adjustment means 126 disposed on the second end 118 of the post 106. The rotational adjustment means 126 may include ways for a user to grasp and rotational engage the post 106 and the disc 104, such as a handle or knob. The rotational adjustment means 126 may be configured to rotate the post 106 about the first axis A1 and thereby also rotate the disc 104 about the first axis A1. The rotational adjustment means 126 may also be configured to militate against the post 106 from undesirably falling through the aperture 120.

In certain circumstances, the rotational adjustment means 126 may be removably coupled to the post 106. In a specific example, as shown in FIGS. 1 and 3-5, the post 106 may include a threaded portion 128. The threaded portion 128 may permit the rotational adjustment means 126 to be removably coupled the post 106. Where the post 106 includes a threaded portion 128, the rotational adjustment means 126 may be a nut. In a more specific example, as shown in FIGS. 6 and 10, the post 106 and the rotational adjustment means 126 may include a retention means 130. The retention means 130 may include a hole 132 disposed through each of the rotational adjustment means 126 and the post 106, thereby allowing a retention means 130 to be disposed therethrough. The hole 132 may be disposed substantially transverse to the first axis A1. In an even more specific example, the retention means 130 may include a cotter key or pin. The retention means 130 may be configured to selectively lock the rotational adjustment means 126 and the post 106 in a desired position. The rotational adjustment means 126 may include an indication arrow 133 to display which direction the first inner surface 110 is oriented. Advantageously, the retention means 130 may militate against the electrical panel cover fastening system 100, 102 from unintentionally loosening or falling into the panel back box 124. One skilled in the art may select any method of removably coupling and locking the post 106 to the rotational adjustment means 126, within the scope of the present disclosure.

In certain circumstances, as shown in FIGS. 6 and 9, the panel back box 124 may include an opening 134 that may further include an edge 136. The edge 136 may include a flange, a lip, and/or a surface the disc 104 may be disposed against. The edge 136 may be disposed on a fourth plane P4, as shown in FIG. 6. The fourth plane P4 may be substantially parallel with the first plane P1 and the second plane P2. Where the post 106 is disposed through the aperture 120 in the panel cover 122, the rotational adjustment means 126 may engage the disc 104 to be disposed against the edge 136 of the panel back box 124. In a specific example, as shown in FIGS. 7 and 11-12, the disc 104 may be disposed in an unengaged position 138 where the disc 104 does not overlap or contact the edge 136. With continued reference to the specific example, the rotational adjustment means 126 may be rotated about the first axis A1 to engage the disc 104. As the disc 104 is engaged about the first axis A1, the second inner surface 112 may contact the edge 136 of the panel back box 124 disposing the electrical panel cover fastening system 100, 102 in an intermediary closed position 140. The disc 104 may continue to be rotated about the first axis A1 until the first inner surface 110 is engaged against the edge 136 of the panel back box 124, disposing the electrical panel cover fastening system 100, 102 in a fully closed position 142, as shown in FIGS. 8 and 13-14. The fourth plane P4 may be substantially adjacent to the second plane P2 where the electrical panel cover fastening system 100, 102 is disposed in the fully closed position 142. Where the panel cover 122 is large and/or heavy, the electrical panel cover fastening system 100, 102 may advantageously be coupled to the panel back box 124 in the intermediary closed position 140 without requiring the panel cover 122 to be completely pressed against the opening 134. Desirably, the variance provided by the intermediary closed position 140 may enhance the efficiency and the repeatability of coupling the panel cover 122 to the panel back box 124.

In certain circumstances, as shown in FIGS. 5-14, the electrical panel cover fastening system 100, 102 may include a plurality of discs 104 and posts 106. Each of the discs 104 may be independently coupled to one of the posts 106. Desirably, the plurality of coupled discs 104 and posts 106 may enhance the reliability of panel cover 122 being coupled to the panel back box 124. In a non-limiting example, the electrical panel cover fastening system 100, 102 may include a first electrical panel cover fastening system 100 and a second electrical panel cover fastening system 102. In a specific example, the disc 104 of the first electrical panel cover fastening system 100 is a mirror image of the disc 104 of the second electrical panel cover fastening system 102. More specifically, the second inner surface 112 of the first electrical panel cover fastening system 100 may be oriented oppositely of the second inner surface 112 of the second electrical panel cover fastening system 102. In a non-limiting example, the opposing orientations of the second inner surfaces 112 may permit the first electrical panel cover fastening system 100 and the second electrical panel cover fastening system 102 to be engaged in opposite rotational directions. For instance, the first electrical panel cover fastening system 100 may be engaged in a clockwise rotational direction and the second electrical panel cover fastening system 102 may be engaged in counterclockwise rotational direction, as shown in FIG. 10. As a non-limiting example, the oppositely engaging electrical panel cover fastening systems 100, 102 may be configured to provide a right-side electrical panel cover fastening system 100 and a left side electrical panel cover fastening system 102. One skilled in the art may select other suitable methods of providing a right-side electrical panel cover fastening system 100 and a left side electrical panel cover fastening system 102.

Figure 1:
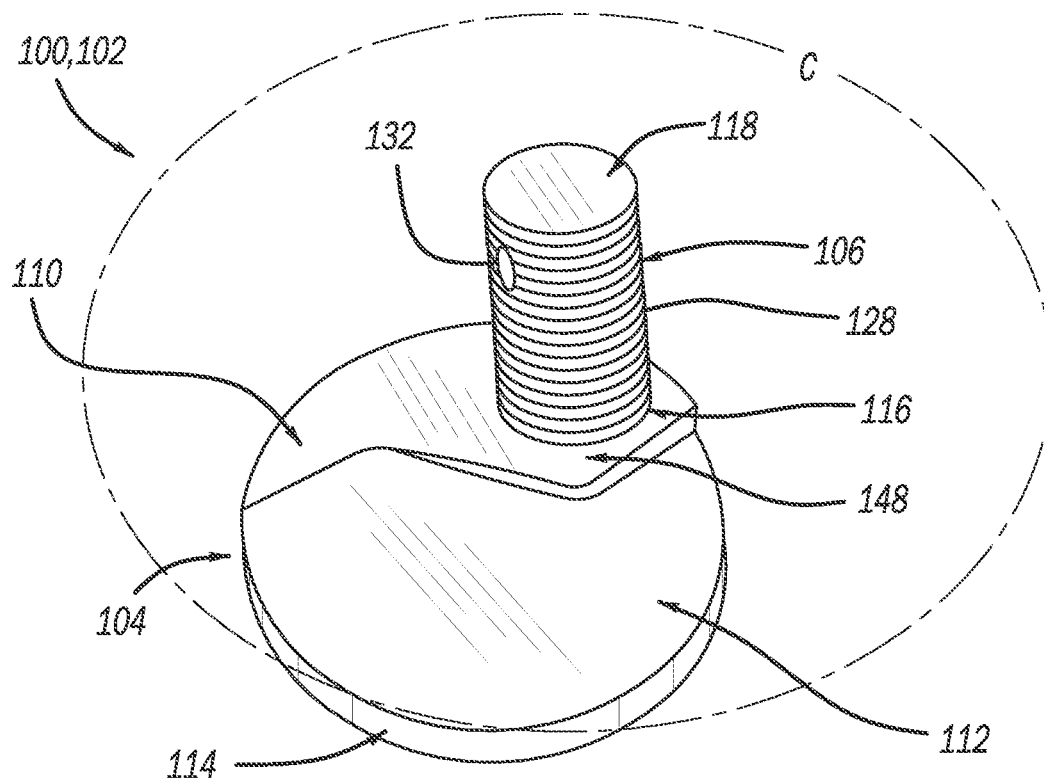
FIG. 1 is a top perspective view of an electrical panel cover fastening system, according to one embodiment of the present disclosure.

In certain circumstances, the disc 104 may have certain features and functionalities such as the disc 104 may be substantially cylindrically shaped. The first axis A1 of the disc 104 may be substantially offset from a center of the disc 104. The center of the disc 104 may be disposed on a second axis A2. As a non-limiting example the post 106 may be substantially offset from the center of the disc 104 where no portion of the post overlaps or otherwise covers the second axis A2. Advantageously, the offset first axis A1 may allow the disc 104 to extend for a greater circumference C, as shown in FIG. 1. Desirably, the greater circumference C of the disc 104 with the offset first axis A1 may permit the disc 104 to be disposed over a greater area of the edge 136 of the panel back box 124, thereby enhancing the engagement of the disc 104 to the edge 136.

In certain circumstances, the disc 104 and the post 106 may be constructed from conductive materials. In a specific, non-limiting example, the conductive materials may include ferrous materials such as iron, steel, or an alloy of metals that would provide enhanced mechanical strength while also providing low resistance to an electrical current flow. Advantageously, where the disc 104 and the post 106 are constructed from conductive materials, the electrical panel cover fastening system 100, 102 may be electrically grounded with the panel back box 124. It should be appreciated that the disc 104 and the post 106 may be constructed for softer metals to provide the conductive properties while also reducing the cost of manufacturing. However, where the disc 104 and the post 106 are provided with ferrous materials, the durability, longevity, and conductive properties are desirably further enhanced. One skilled in the art may select other materials to construct the disc 104 and the post 106, within the scope of the present disclosure.

It should be appreciated that the disc 104 and the post 106 may be provided as a unitary structure. As a non-limiting example, the disc 104 and the post 106 may be machined and/or milled from a single structure.

In certain circumstances, as shown in FIG. 4, the third plane P3 may be oriented substantially transverse to each of the first plane P1 and the second plane P2. In a specific example, the third plane P3 may be oriented at a first angle α of about 3-35 degrees relative to the second plane P2. In a more specific example, the third plane P3 may be oriented at a first angle α of about 20 degrees. Advantageously, where the third plane P3 is oriented at a first angle α of about 20 degrees, the second inner surface 112 may more easily engage against the edge 136 while also providing an adequate clamping pressure to retain a panel cover 122 in the intermediary closed position 140 or the fully closed position 142.

Figure 2:
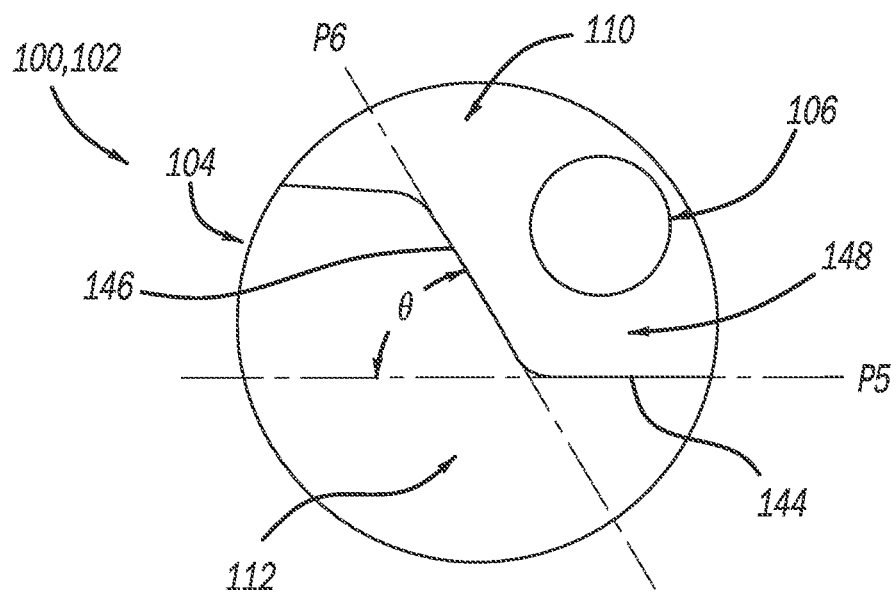
FIG. 2 is a top plan view of the electrical panel cover fastening system, as shown in FIG. 1.

In certain circumstances, as shown in FIG. 2, the electrical panel cover fastening system 100, 102 may further include a raised edge 144, 146 disposed between and oriented substantially transverse to each of the second plane P2 and the third plane P3. The raised edge 144, 146 may be configured to provide a substantially flat platform 148 on the first inner surface 110. In a specific example, the raised edge 144, 146 may include a first wall 144 and a second wall 146. The first wall 144 may be disposed on a fifth plane P5 and the second wall 146 disposed on a sixth plane P6. The fifth plane P5 may be oriented substantially transverse to the sixth plane P6. In a more specific example, the fifth plane P5 may be oriented at an angle θ of about 30-60 degrees relative to the sixth plane P6. As shown in FIG. 4, the first wall 144 may include a first height H1 and the second wall 146 may include a second height H2. The first height H1 may be greater than the second height H2. In certain circumstances, the second height H2 may be about half the first height H1. It should be appreciated that, in certain circumstances, the first height H1 may extend from the first plane P1 to the second plane P2. Advantageously, the raised edge 144, 146 may form a substantially flat platform 148 that the post 106 may be coupled to.

In certain circumstances, as shown in FIGS. 9-14, the electrical panel cover fastening system 100, 102 may include a panel bracket 150 disposed at a bottom surface 152 of the panel back box 124. In a non-limiting example, the panel bracket 150 may include a substantially L-shaped flange. In operation, the panel bracket 150 may be configured to support the panel cover 122. Advantageously, the panel cover 122 may be disposed on the panel bracket 150 while the panel cover 122 is coupled to the panel back box 124. Desirably, the support provided by the panel bracket 150 may enhance the ergonomics of coupling a panel cover 122 to the panel back box 124. A skilled artisan may select any structure and any number of panel brackets 150 to support the panel cover 122, within the scope of the present disclosure.

In certain embodiments, as shown in FIG. 15, the electrical panel cover fastening system 100, 102 may be provided as a kit 200 for installation of the panel cover 122 on the panel back box 124. The kit 200 may include an electrical panel cover fastening system 100, 102 which may further include a disc 104, a post 106, and a rotational adjustment means 126. The disc 104 may include an outer surface 108, a first inner surface 110, a second inner surface 112, and a side surface 114. The outer surface 108 may be disposed on a first plane P1. The first inner surface 110 may be disposed on a second plane P2. The first plane P1 may be disposed substantially parallel with the second plane P2. The second inner surface 112 may be disposed on a third plane P3. The first inner surface 110 and the second inner surface 112 may be disposed adjacent to one another. The post 106 may include a first end 116 and a second end 118. The post 106 may be disposed on a first axis A1. The first end 116 of the post 106 may be configured to be disposed on the first inner surface 110 of the disc 104. The kit 200 may also include a panel cover 122 with an aperture 120 formed therethrough. The aperture 120 may be disposed adjacent to a perimeter of the panel cover 122. The post 106 may be configured to be disposed through the aperture 120 in the panel cover 122. The rotational adjustment means 126 may be configured to be disposed on the second end 118 of the post 106. The rotational adjustment means 126 may also be configured to rotate the post 106 about the first axis A1 and thereby also rotate the disc 104 about the first axis A1. In certain circumstances, the kit 200 may also include a panel back box 124 including an opening 134. The opening 134 may further include an edge 136. In certain circumstances, the kit 200 may further include a panel bracket 150 configured to be attached to the panel back box 124. The panel bracket 150 may also be configured to support the panel cover 122.

In certain embodiments, as shown in FIG. 16, the present technology may be used according to a method 300 of covering a panel back box 124. The method 300 may include a step 302 of providing an electrical panel cover fastening system 100, 102. The electrical panel cover fastening system 100, 102 may include a disc 104 and a post 106. The disc 104 may include an outer surface 108, a first inner surface 110, a second inner surface 112, and a side surface 114. The outer surface 108 may be disposed on a first plane P1. The first inner surface 110 may be disposed on a second plane P2. The first plane P1 may be disposed substantially parallel with the second plane P2. The second inner surface 112 may be disposed on a third plane P3. The first inner surface 110 and the second inner surface 112 may be disposed adjacent to one another. The post 106 may include a first end 116 and a second end 118. The post 106 may be disposed on a first axis A1. The first end 116 of the post 106 may be coupled to the first inner surface 110 of the disc 104. The post 106 may be configured to be disposed through an aperture 120 in a panel cover 122. The method 200 may further include a step 304 of providing the panel cover 122 with the aperture 120 formed therethrough. The panel back box 124 may also be provided in a step 306. The panel back box 124 may include an opening 134 which may further include an edge 136. In certain circumstances, the method 300 may include a step 308 of providing a panel bracket 150 configured to be attached to the electrical panel back box 124 for supporting the panel cover 122. The panel bracket 150 may be attached to a bottom surface 152 of the panel back box 124 in a step 310. The electrical panel cover fastening system 100, 102 may be disposed through the aperture 120 in the panel cover 122 in another step 312. Then, the panel cover 122 may be placed on the panel bracket 150 in a step 314. Next, the panel cover 122 may be disposed against the opening 134 of the panel back box 124 in a further step 316. Then, in another step 318, the electrical panel cover fastening system 100, 102 may be rotated to engage the first inner surface 110 and/or the second inner surface 112 against the edge 136 adjacent the opening 134 of the panel back box 124, thereby securing the panel cover 122 to the panel back box 124.

Advantageously, the electrical panel cover fastening system 100, 102 may enhance the efficiency and the ergonomics of coupling and removing a panel cover 122 to and from a panel back box 124.

While certain representative embodiments and details have been shown for purposes of illustrating the invention, it will be apparent to those skilled in the art that various changes can be made without departing from the scope of the disclosure, which is further described in the following appended claims.

What is claimed is:

1. An electrical panel cover fastening system, comprising:
   a disc including an outer surface, a first inner surface, a second inner surface, and a side surface, the outer surface disposed on a first plane, the first inner surface disposed on a second plane, the first plane disposed substantially parallel with the second plane, the second inner surface disposed on a third plane, each of the first inner surface and the second inner surface disposed adjacent to one another, wherein the third plane is oriented substantially transverse to each of the first plane and the second plane;
   a post including a first end and a second end, the post disposed on a first axis, the first end of the post coupled to the first inner surface of the disc; and
   a raised edge disposed between each of the second plane and the third plane, the raised edge including a first wall and a second wall, the first wall disposed on a fifth plane and the second wall disposed on a sixth plane, the fifth plane oriented transverse to the sixth plane.

2. The electrical panel cover fastening system of claim 1, wherein the first axis is substantially offset from a center of the disc, wherein the center of the disc is disposed on a second axis.

3. The electrical panel cover fastening system of claim 1, wherein the third plane is oriented at an angle of about three degrees to about thirty-five degrees relative to the second plane.

4. The electrical panel cover fastening system of claim 1, wherein the fifth plane is oriented at an angle of about thirty degrees to about sixty degrees relative to the sixth plane.

5. The electrical panel cover fastening system of claim 1, wherein the first wall includes a first height, the second wall includes a second height, and the first height is greater than the second height.

6. The electrical panel cover fastening system of claim 1, further comprising a rotational adjustment means disposed on the second end of the post, the rotational adjustment means configured to rotate the post about the first axis and thereby also rotate the disc about the first axis.

7. The electrical panel cover fastening system of claim 6, wherein the post includes a threaded portion configured to couple the post to the rotational adjustment means.

8. The electrical panel cover fastening system of claim 7, wherein the post includes an aperture disposed through the post substantially transverse to the first axis, the aperture configured to accept a retention means for coupling the post and the rotational adjustment means.

9. The electrical panel cover fastening system of claim 1, further comprising a pair of discs and a pair of posts, each is coupled to one of the posts, the pair of discs being substantially mirror images of each other.

10. A kit for covering a panel back box, the kit comprising:
a panel cover for the panel back box, the panel cover including an aperture;
an electrical panel cover fastening system including:
a disc including an outer surface, a first inner surface, a second inner surface, and a side surface, the outer surface disposed on a first plane, the first inner surface disposed on a second plane, the first plane disposed substantially parallel with the second plane, the second inner surface disposed on a third plane, each of the first inner surface and the second inner surface disposed adjacent to one another, and
a post including a first end and a second end, the post disposed on a first axis, the first end of the post disposed on the first inner surface of the disc, the post configured to be disposed through the aperture in the panel cover; and
a rotational adjustment means configured to be disposed on the second end of the post, the rotational adjustment means is configured to rotate the post about the first axis and thereby also rotate the disc about the first axis;
a panel back box including an opening, the opening further including an edge; and
a panel bracket configured to be attached to the panel back box for supporting the panel cover.

11. The kit of claim 10, wherein the aperture is disposed adjacent to a perimeter of the panel cover.

12. A method of covering an electrical panel, the method comprising the steps of:
providing an electrical panel cover fastening system including:
a disc including an outer surface, a first inner surface, a second inner surface, and a side surface, the outer surface disposed on a first plane, the first inner surface disposed on a second plane, the first plane disposed substantially parallel with the second plane, the second inner surface disposed on a third plane, each of the first inner surface and the second inner surface disposed adjacent to one another, wherein the third plane is oriented substantially transverse to each of the first plane and the second plane,
a post including a first end and a second end, the post disposed on a first axis, the first end of the post disposed on the first inner surface of the disc, the post configured to be disposed through an aperture in a panel cover, and
a raised edge disposed between each of the second plane and the third plane, the raised edge including a first wall and a second wall, the first wall disposed on a fifth plane and the second wall disposed on a sixth plane, the fifth plane oriented transverse to the sixth plane;
providing a panel cover with an aperture formed therethrough;
providing a panel back box with an opening that includes an edge;
disposing the electrical panel cover fastening system through the aperture of the panel cover;
placing the panel cover against the opening of the panel back box; and
rotating the electrical panel cover fastening system to engage at least one of the first inner surface and the second inner surface with the edge adjacent the opening of the panel back box,
whereby the panel cover is secured to the panel back box.

13. The method of claim 12, further comprising a step of providing a panel bracket configured to be attached to the panel back box for supporting the panel cover.

14. The method of claim 13, further comprising a step of attaching the panel bracket to a bottom surface of the panel back box.

15. The method of claim 14, further comprising a step of placing the panel cover on the panel bracket prior to the step of rotating the electrical panel cover fastening system to engage the at least one of the first inner surface and the second inner surface with the edge adjacent the opening of the panel back box.

16. An electrical panel cover fastening system, comprising:
a disc including an outer surface, a first inner surface, a second inner surface, and a side surface, the outer surface disposed on a first plane, the first inner surface disposed on a second plane, the first plane disposed substantially parallel with the second plane, the second inner surface disposed on a third plane, each of the first inner surface and the second inner surface disposed adjacent to one another;
a post including a first end and a second end, the post disposed on a first axis, the first end of the post coupled to the first inner surface of the disc; and
a rotational adjustment means disposed on the second end of the post, the rotational adjustment means configured to rotate the post about the first axis and thereby also rotate the disc about the first axis;
wherein the post includes a threaded portion and an aperture, the threaded portion configured to couple the post to the rotational adjustment means, the aperture disposed through the post substantially transverse to the first axis, the aperture configured to accept a retention means for coupling the post and the rotational adjustment means.

* * * * *